United States Patent Office 3,119,448
Patented Jan. 28, 1964

3,119,448
PERMEABLE WELL CEMENT
Vaughan W. Rhoades, Tulsa, Okla., assignor to Cities
Service Research and Development Company, New
York, N.Y., a corporation of New Jersey
No Drawing. Filed Oct. 5, 1962, Ser. No. 228,759
15 Claims. (Cl. 166—12)

This invention relates to permeable cement filters and more particularly to the use of permeable cement in forming such filters as a screening media for unconsolidated producing horizons of oil and gas wells. Positioning permeable cement in the vicinity of the incompetent formation effectively screens and limits the migration of sand into the wellbore and production tubing. Migration of sand or other particles into the wellbore and production tubing leads to a multitude of problems such as collapsing of the casing or sloughing of the wellbore wall, plugging of the wellbore, damage to pumping equipment and producing strings and etc. While unconsolidated sands are found in numerous oil and gas producing areas, the most predominant areas are along the offshore and coastal marsh regions of the United States where production is from the more recent sediments such as the Miocene formation.

Several approaches have been made in an attempt to exclude sand from such producing wells. One method involves the so-called gravel packing technique in which gravel is positioned in the borehole adjacent to producing formations with fluid pressure. By applying pressure and reciprocating the drill pipe or tubing, gravel is forced through the perforations against the sand face of the formation and into fractures of the formation. A more recently adapted technique involves the use of crushed walnut shells which are coated with an unset plastic and injected into the producing zone by means of a carrier fluid. The plastic is then allowed to set with the crushed walnut shells being consolidated into a permeable filter screen.

While the foregoing methods and others have been used with some success, they have not been entirely satisfactory in that sand migration still occurs with plugging generally resulting. Moreover, the application of these techniques is rather expensive and time consuming. The ideal solution would be the utilization of a pumpable permeable cement which would perform the function of supporting the formation and simultaneously act as a filtering media so that the migration of sand particles to the producing wellbore would not occur. Prior patent art such as U.S. 2,187,895, U.S. 2,240,622, U.S. U.S. 2,288,557, and U.S. 2,815,815 teach the preparation and utilization of various types of permeable well cement compositions. In cement compositions prepared according to the foregoing teachings, rather high permeabilities are disclosed. Unfortunately, these cements have not been effective as filter media. The reason for this difficulty is believed to be that while high permeability is generally desirable in order to allow free passage of fluid, a filter having too high a permeability allows entrance of small sand particles which then plug the filter especially near the wellbore. The above-mentioned cements are merely placed within the wellbore opposite the producing horizon and are not pressured or squeezed into the producing formation. These reasons apparently explain the industry's failure to adopt previously proposed permeable cement compositions and methods of placing such compositions in wellbores opposite highly unconsolidated sand producing zones.

The present invention makes it possible to provide a permeable cement filter media which is capable of effectively filtering and preventing migration of sand particles which, according to prior techniques, have not been controllable.

It is the object of the present invention to provide an improved permeable cement filtering media for preventing migration of sand into wells.

Another object of the invention is to provide an improved cement slurry and method of placing the same to form a permeable cement filter in the formation.

In accordance with a preferred embodiment of the present invention, an improved permeable cement filter is provided in the formation by preparing a permeable cement slurry comprised of granular solids, fibrous material, a cementing agent, and water, and pumping the resulting slurry down the wellbore under sufficient pressure to force the slurry through perforations in the well casing and into the unconsolidated sand formation adjacent to the wellbore. The slurry is placed under sufficient pressure to cause substantial dehydration of the slurry and subsequent bridging of the granular material to form a solid filter mass, the permeability of which is relatively greater adjacent the wellbore and relatively lower at the outer portions of the filter mass adjacent the formation. The cement slurry of the present invention is preferably placed under sufficient pressure to cause a portion of the cement to migrate through the slurry to the interface between the formation and the periphery of the slurry to thereby form a relatively low permeability cement sheath at the interface of the slurry and the formation.

By forming a permeable cement filter in accordance with the preferred embodiment of the invention described above, the permeability of the filter is least in the sheath at the interface of the cement and formation material and greatest adjacent the wellbore. The low permeability sheath adjacent the interface effectively filters sand, while the relatively large area of the interface insures that plugging due to such low permeability will not occur and that the total amount of fluid free to pass through the low permeability sheath is sufficient so that productivity of the well is not lessened by the low permeability of this portion of the cement filter. The portions of the cement filter nearer the wellbore, having a higher permeability, allow free flow of fluid and do not have to be of such low permeability as the outer portions of the filter, since sand is filtered out by the outer portion, especially the low permeability sheath. The portion of the filter adjacent the wellbore may thus be of sufficient permeability to allow free flow of fluid at desired rates.

The cement slurry used in forming permeable cement filters in accordance with the invention comprises, broadly, a mixture of cement, granular solids, fibrous material, water, and a water-soluble gelling agent. The granular material is inert and is preferably well rounded, relatively clean, physically strong and has a density suitable for suspension in the slurry. Generally speaking, densities up to about 3 grams per cc. are suitable. It has been found that granular material of a size between about 10 and about 40 mesh, preferably between about 20 and 30 mesh, is most suitable. The use of substantial amounts of granular material of other sizes does not yield a suitable slurry for the purpose of the present invention. For instance, the use of relatively larger size solids has an adverse effect on the strength of the resulting cement filter, while the use of smaller size solids reduced the permeability of the filter. While sand is a preferred granular solid, other suitable solids such as glass beads or aluminum pellets may be used.

The cement used in forming the slurry of permeable cement in accordance with the invention is Portland type cement having good bonding ability and high strength. Laboratory tests have indicated that cement having an average particle size of cement particles that the slurry and ultimate filter of the present invention is distinguished from the prior art. The migration of these small cement particles to the interface of the slurry and the formation is necessary in order to obtain a permeable cement filter media which will effectively prevent migration of sand into wells. In addition, small particle size cement does not react with formation water to cause precipitation of solids from the formation water as readily as more conventional cement of larger particle size. The reason for this is not clear but may be due in part to the rapidity with which the small particle cement cures. One of the more suitable bonding materials, for instance, is that which is sold under the trade name of Trinity Lite-Wate cement (a Portland type cement having an average particle size of about 1.6 microns). This compares with an average particle size of about 5.7 for more conventional Portland type cement.

The function of the fibrous material in the cement slurry is to combine with the water and cement in such a way as to aid in suspension of the granular particles in the slurry. The ability to support aggregate in the slurry is essential to delivery of the slurry to the desired position in the formation. Quite obviously, if the aggregate tends to leave the slurry during transit to the formation, either in the tubing or in the casing, it will be impossible to force the slurry through the perforations in the well casing and to create a filter mass at a distance from the wellbore. A water absorbing fiber is, of course, desired for this purpose. Conventional fibrous asbestos has been found especially suitable for this purpose, although other synthetic or natural fibrous materials of similar characteristics may be used. It is necessary that the fibrous material be dispersible in water on mixing.

In addition to the cement, aggregate, and fibrous material, suitable amounts of a gelling agent are used to prevent premature separation of undue amounts of water from the slurry resulting in subsequent sand fall out while pumping the slurry down the tubing and casing. The use of a gelling agent for this purpose is especially important when the slurry is to be placed through perforations in a well casing. In the absence of such gel, it is difficult or impossible to maintain the solids in suspension and there is a strong tendency for the granular solids to bridge on the casing perforations and restrict flow through said perforations. Suitable gels are those which are water soluble and provide sufficient gelling action to support the granular particles in suspension in the slurry, are stable in the pH range of cement, and have no apparent effect on setting time, strength, permeability, or chemical properties of the cement.

Conventional gels such as polyacrylamide are, for instance, suitable for this purpose. Generally speaking, a gel which is water-soluble and will increase the viscosity of the slurry to a pumping state without solids fall-out is desired. It is highly desirable that the gel be one which will not substantially increase in viscosity either by pH change, or by increase in temperature or by combining with materials in the formation to effect the gel characteristics. The gel should preferably be inert with respect to the formation and formation fluids. The characteristics of the gel water expelled when the cement is placed should not change to the extent that when production is resumed, this expelled gel water will have a limiting or detrimental effect upon fluid flow to the wellbore.

While a variety of materials may be used, as described above, in forming the cement slurry and these ingredients may be present in any suitable quantities, preferred cement slurries which yield filters of desirable permeability and strength, while simultaneously creating the desired interface sheath may be blended from the following ingredients used in the amounts in the range indicated.

| Ingredients: | Parts by weight |
| --- | --- |
| Inert granular solids | 140–200 |
| Portland cement | 20–65 |
| Water | 100–200 |
| Water insoluble fibrous material | 2–4 |
| Water soluble gel | 0.01–1.0 |

It is generally preferred that the weight ratio of granular material to cement be between about 4 and about 7, the weight ratio of water to water-soluble gel between about 100 and about 2500, preferably between about 250 and about 550, and the weight ratio of total solids to water between about 1 and about 2. The use of excessive quantities of gel in the slurry should be avoided because the use of too much gel lowers the permeability of the resulting cement filter.

In some instances, it may be desirable, especially when flushing with light oil, as described below, to utilize light hydrocarbon oil in the blending of the cement slurry. This may be accomplished by substituting a light oil such as kerosene for a portion of the water in forming the slurry. While the use of light oil in the slurry in this manner may in some instances reduce the strength of the resulting cement filter, especially when larger quantities of oil are utilized, it is generally possible to use up to about 20% by volume of light oil in this manner.

An especially suitable cement slurry for use in accordance with the present invention may, for instance, be blended from the following ingredients:

| | Pounds |
| --- | --- |
| 20–30 mesh sand | 1600 |
| Asbestos fiber | 30 |
| Polyacrylamide gel | 3.3 |
| Water | 1300 |
| Cement (preferably having an average particle size of about 1.6 microns) | 325 |

While the cement slurry compositions discussed above are suitable for use in wells of depth on the order of 5000 or 6000 feet, wells of greater depths may require modifications of this slurry composition. For instance, deeper wells in which the temperature may average about 200° F. at 10,000 feet, will require the use of additional water-soluble gel in order to retain the desired suspension of solids. Obviously, care must be used in increasing the amount of gel since an excess amount of gel may adversely effect the permeability of the resulting cement filter. Tests have demonstrated that slurries containing up to about twice the normal amount of water-soluble gel may be mixed, pumped, and placed under relatively high temperature conditions with satisfactory permeability characteristics.

In practising the present invention, the well into which the permeable cement filter is to be placed will usually be a well which has been suffering from severe sand migration problems from the adjacent formation. In many cases, the well may be at least temporarily out of production due to an excessive amount of sand in the wellbore. The first step in treating a well in accordance with the invention will normally involve reverse circulating or bailing the sand from the hole. The tubing with a packer may then be run into the casing and pressure tested if desired at pressures up to slightly above the pressure anticipated as necessary to perform a satisfactory squeezing of the slurry.

The water normally present in the well is then displaced with oil and the pump-in rate of the oil into the formation is determined. It is important that the portion of the hole in the vicinity of the perforated interval be free of water when the cement slurry is injected, since the presence of water would tend to dilute the slurry at the slurry-water interface and allow the sand to separate from the slurry, resulting in bridging of the slurry at the perforations. An alternative to filling the casing with oil to displace the water which is normally present is to precede the cement slurry with a slug of oil greater in volume than the volume of water in the casing below the packer. Using an oil volume as great or preferably slightly greater than the volume of water present will cause water displacement in the area of the perforations and prevent water contact with the cement slurry. If the slurry is diluted with water to the point at which sand fall-out occurs, bridging of the slurry will result at the perforations preventing entry of the slurry into the formation.

The preferable method of making cement slurry is to mix the asbestos with a portion of mix water, to this is added the desired amount of cement. Mixing is continued until a smooth and homogeneous slurry is obtained. To this mix is added the desired concentration of gel water. While mixing continues, the aggregate is added to complete the slurry mix. To accomplish the movement of the slurry to the formation, the slurry will normally be followed by a liquid which will not adversely affect the slurry. For this purpose, fluids such as water, diesel oil, kerosene, or crude oil can be used.

The permeable cement slurry is forced radially out into the formation under pressure sufficient to simultaneously force some of the cement particles to migrate through the slurry to form a sheath of low permeability at the slurry-water interface as described below. The maximum pressure is held for sufficient length of time to allow compaction of the slurry and subsequent bridging of the granular particles effecting at least a partial displacement of water from the slurry. A maximum pressure which may be used in forcing cement slurry into the formation depends on a number of factors such as over-burden pressure and tubing and casing strength. Pressures used are generally similar to those used in conventional squeeze cementing, the upper limit of such pressure being that which might cause fracturing of the formation. The time during which the maximum pressure must be held will vary considerably from well to well. If pressure is released too soon and backflow occurs, the cement should be replaced in the formation by repressuring and the pressure held for whatever length of time is necessary to obtain dehydration of the cement sufficient to bridge the granular particles.

After squeezing, a portion of the cement slurry will probably remain in the casing below the packer and opposite the perforated interval. It is preferred to unseat the packer and reverse circulate the remaining cement from the hole. It is then desirable to force a light oil such as kerosene, diesel oil, or any suitable crude oil through the permeable cement filter in an amount equal to at least ½ the volume of cement slurry placed in the formation. Such oil flushing aids in enlarging the matrix channels of the cement filters. The presence of the oil during further setting of the cement fills the connected channels and prevents setting of cement within these channels. By squeezing and by flushing with oil, as described above, excess water is displaced from the slurry into the formation and at least a portion of the cement is displaced from the pores effectively enlarging said pores.

As has been previously described, a portion of the cement, during compaction, will migrate to the periphery of the cement mass to form a thin sheath of relatively low permeability at the interface of the cement mass and the formation. As has been previously indicated, it is the formation of this unique sheath that makes the cement composition of the present invention unexpectedly and uniquely effective in minimizing the migration of sand to the wellbore. This sheath of considerably lower permeability than the main portion of the resulting cement filter, serves to prevent entry of extremely small sand particles into the main body of the filter. Due to such migration of cement particles and the sheath formation, the permeability of the main portion of the cement filter is least at the outer periphery adjacent the sand formation and is greatest nearer the wellbore. While this sheath is effective in limiting said migration, it must be recognized that the cement mass itself accomplishes this effect. The permeability of the main portion of the cement filter appears, in general, to vary inversely with the distance from the wellbore. Migration of the cement takes place during compaction as the cement is placed in the formation under relatively high squeeze pressures. Such migration tends to wash out a portion of the cement particles from the interstices of the granular solids and leaves only enough cement to bond the solid particles, thus leaving open pores between solids through which fluid may flow.

In the formation of a low permeability cement sheath, as described above, formation sand as well as solids in the cement slurry are preferably utilized. That is, cement particles migrate to the outer edge of the cement slurry and at least some of these cement particles combine with the formation said to aid in forming the relatively low permeability sheath at the interface between the cement slurry and the formation sand. During the migration of the cement, a small amount of slurry aggregate may also move to the slurry periphery and aid in the sheath formation. This sheath normally has a permeability of less than about $\frac{1}{10}$ the average permeability of the remainder of the filter mass. Thus the permeability of the sheath may be, for instance, between about 1 and about 10 millidarcies, md., while the permeability of the remainder of the cement filter may be between about 100 md. and about 3000 md. The low permeability sheath is fairly thin in comparison to the remainder of the cement filter and may, for instance, be on the order of 1 cm. or less in thickness.

In function, this low permeability sheath prevents the fine formation sand from entering the filter material, while the relatively greater permeability of the filter towards the wellbore permits free flow of fluid through the filter to the wellbore. At the same time, the relatively large area of the sheath allows sufficient fluid to enter even though the permeability is fairly low and of an order of magnitude which would be less desirable if placed close to the wellbore.

After the permeable cement filter has been placed, as described, and squeezed, excess cement remaining in the casing is then removed by reverse circulation. Oil is then pressured through the cement mass to increase and maintain permeability. The well is then placed on production.

The following examples will serve to illustrate the practice of the present invention. Examples 1 and 2 described herein. Data obtained by a laboratory experiment showing the existence of the low permeability sheath is also presented.

EXAMPLE I

In the first test, a cased well completed in a Marginulina sand which was off production due to severe sand problems was selected. The well was believed to have a capacity of 10 barrels of oil per day and 90 barrels of water per day. In preparation for cement injection, the hole was circulated clean to 5217 feet. Prior to cement injection, the tubing was tested at 2600 p.s.i.g. and the casing to 1200 p.s.i.g. Salt water in the wellbore was completely displaced by kerosene. A fullbore packer was set at 4750 feet with a 30 foot stinger ending in a muleshoe at 4780 feet. The pump-in rate with kerosene was determined to be 3 barrels per minute at 1800 p.s.i.g.

The following slurry was then prepared in a 12 barrel mechanical mixer equipped with a horizontal paddle shaft.

Ingredients: Amount
- Ottawa sand (20–30 mesh) ............lbs__ 2800
- Trinity Lite-Wate cement ............lbs__ 564
- Asbestos ............................lbs__ 52
- Polyacrylamide gelling agent ........lbs__ 7.5
- Water ...............................bbl__ 6.5

The slurry weight was 14.2 pounds per gallon.

The cement slurry was then pumped into the tubing at an average rate of 2.7 barrels per minute at 1800 p.s.i.g., forcing the kerosene into the formation ahead of the slurry. As cement injection through the casing perforations began, the injection rate gradually slowed to about 2 barrels per minute and the pressure climbed steadily. After approximately 5 barrels of slurry had been injected into the formation, tubing pressure had increased to 3800 p.s.i.g. with no injection. This pressure was held for 1 minute and then released. Approximately 1 to 2 barrels of slurry backflowed into the casing. The tubing was then repressured to 3800 p.s.i.g. and held at this pressure for 1 hour. No backflow was encountered when the pressure was released.

Mechanical difficulty prevented reverse circulation of the cement and the hole was left full of kerosene. The cement was allowed to cure for 43 hours before being drilled out. After the cement was drilled out, the well was placed on production. Five months after placement of the permeable cement filter, as described above, in which 4 barrels of slurry or about 2.5 barrels of compacted cement were placed in the formation, this well was producing 110 barrels of fluid per day, of which about 10 barrels were oil. Analysis of the produced liquids gave no indication of sand migration into the wellbore.

EXAMPLE II

In another field test of the composition and method of this invention, a well was utilized which originally had been completed in the Marginulina sand for a potential of 95 barrels of oil per day. The well at the time was squeezed with 67 sacks of cement to a pressure of 3500 p.s.i.g. and was perforated with 48 shots from 5218 feet to 5235 feet. The well had an extended history of sand production and was temporarily abandoned due to sanding conditions at the time of placement of the permeable cement filter as described below. Prior to this treatment, it was estimated that the well had a production potential of 10 barrels of oil per day and 30 barrels of water per day.

In preparation for cement injection, the hole was circulated clean to 5248 feet. In order to conserve kerosene, the hole was displaced with crude oil from a nearby well. A fullbore packer was set at 4954 feet with a 48 foot stinger. While 25 barrels of kerosene was being pumped into the tubing and below the packer, the formation injection rate was established at 4.4 barrels per minute at 2800 p.s.i.g. The following slurry was then mixed in a mechanical mixer equipped with a horizontal paddle shaft:

Ingredient: Amount
- Ottawa sand (20–30 mesh) ..........lbs____ 2800
- Trinity Lite-Wate cement ..........lbs____ 564
- Asbestos fiber ....................lbs____ 52
- Polyacrylamide gelling agent ......lbs____ 8.35
- Water .............................bbl____ 6.5

Cement slurry was then pumped into this tubing forcing the kerosene into the formation. As the cement entered the formation, the pressure climbed steadily to 3500 p.s.i.g. and the injection rate dropped to 1/16 barrel per minute. An additional half barrel was placed in the formation at this injection rate at 3500 p.s.i.g. At this point, the pump engine died and the pressure bled off to 2500 p.s.i.g. before the engine was restarted. In repressuring to 3500 p.s.i.g., another 1/2 barrel of cement was placed in the formation, making a total of 6 barrels. After maintaining this pressure for approximately 10 minutes, the tubing pressure was bled to zero and backflow occurred, indicating that the cement in the formation was not completely compacted. In repressuring to 3500 p.s.i.g., 3/4 of a barrel of cement slurry was replaced in the formation. Backflow also occurred after the next two pressuring processes. The packer was released and the tubing was reverse circulated in-place. The packer was reset at 4954 ft. The casing was pressured to 1000 p.s.i.g. and the tubing to 3500 p.s.i.g. Upon releasing the tubing and casing pressure after an hour and a half, no backflow was obtained. The cement was then allowed to cure for 30 hours before drilling out. Upon drilling out, cement was found in the casing at 5046 ft. This represents a total of 4.9 barrels of cement within the casing indicating that approximately 5 barrels of slurry were placed in the formation. The cement was drilled out and the well was placed on production. In the six months following this treatment, the well averaged a daily production of 5 barrels of oil and 35 barrels of water with no evidence of sand migration into the wellbore as evidenced by analysis of the produced liquids.

As previously pointed out, the formation of a relatively low permeability cement sheath is an important feature of the present invention. The existence of this sheath is shown by the following laboratory experiment. A one-inch diameter permeable core was prepared by first placing a thin layer of 20–30 mesh Ottawa sand inside, at the bottom, of a one inch plastic pipe. On top of this layer was placed a bed of 60–80 mesh sand. This core was provided with a permeable cement filter by pouring a permeable cement slurry, prepared in accordance with the present invention, through the top of the pipe on top of the layers of sand. Water was then injected, under pressure, through the top of the pipe onto the cement. As a result, water from the slurry was forced through the sand pack in the bottom of the pipe into the outlet flow line at the bottom end of the pipe. As the filtrate water was forced out of the compacting cement, a small amount of cement was taken along and deposited at the interface between the sand and cement, thereby forming a low permeability sheath. The cement was cured in water for 48 hours at 140° F. and 1500 p.s.i.

After the curing period, the core was cut into four sections, as indicated in the table shown below. Section A represents the section of core adjacent a wellbore and sections B, C and D represent sections respectively further removed from a wellbore, with section D adjacent to the sheath at the interface of the cement mass and the formation sands. Oil of a known viscosity was then forced through each section at a constant pressure. Flow rates were observed, and the permeability of each section was calculated according to standard practice with the following results:

Table

| Section | Length (cm.) | Permeability to Kerosene (md.) |
|---|---|---|
| A | 7.1 | 294 |
| B | 6.8 | 270 |
| C | 7.0 | 251 |
| D | 6.8 | 236 |
| Sheath | 0.1 | 3.2 |

From the data set forth in the foregoing table, it can be seen that the permeability of the main portion of the cement filter varies inversely as the distance from the wellbore to the sheath. It will be further noted that the thin sheath has a relatively high degree of impermeability as compared to the permeability of the main portion of the cement filter located between the sheath and the wellbore.

While the invention has been described above with

I claim:

1. A pumpable cement slurry for use in forming a permeable cement filter in earth formations comprising between about 140 and about 200 parts by weight inert granular solids of a size range between about 10 and about 40 mesh, between about 20 and about 65 parts by weight of Portland type cement having an average particle size less than about 3 microns, between about 2 and 4 parts by weight of water absorbing fibrous material, between about 0.01 and about 1.0 part by weight of a water-soluble gel and between about 100 and about 200 parts by weight water.

2. The cement slurry of claim 1 in which the weight ratio of sand to cement is between about 4 and about 7, the weight ratio of water to water-soluble gel is between about 100 and about 2500 and the weight ratio of solids to water is between about 1 and about 2.

3. A pumpable cement slurry for use in forming a permeable cement filter in the unconsolidated formation adjacent the wellbore and comprising between about 140 and about 200 parts by weight sand of an average particle size between about 20 and about 30 mesh, between about 20 and about 65 parts by weight Portland cement, having an average particle size less than about 3 microns, between about 2 and about 4 parts by weight water absorbing fibrous material, between about 0.25 and about 0.40 parts by weight water soluble gel and between about 100 and about 200 parts by weight water and in which the weight ratio of sand to cement is between about 4 and about 7, the weight ratio of water to water-soluble gel is between about 250 and about 550 and the weight ratio of total solids to water in the slurry is between about 1 and about 2.

4. A pumpable cement slurry for use in forming a permeable cement filter in the unconsolidated formation adjacent a wellbore and comprising about 160 parts by weight of 20–30 mesh sand, about 3 parts by weight asbestos fiber, about 0.33 part by weight polyacrylamide water soluble gel, about 130 parts by weight water and about 32.5 parts by weight Portland type cement having an average particle size of about 1.6 microns.

5. The method of providing a permeable cement filter in formations adjacent oil and gas wells which comprises preparing a cement slurry comprising between about 140 and about 200 parts by weight inert granular solids of a size range between about 10 and about 40 mesh, between about 20 and about 65 parts by weight Portland type cement having an average particle size less than about 3 microns, between about 2 and about 4 parts by weight water absorbing fibrous material, between about 0.01 and about 1 part by weight water soluble gel and between about 100 and about 200 parts by weight water, pumping said slurry down a wellbore under sufficient pressure to force the slurry into the formation adjacent said wellbore, said pressure being sufficient to cause dehydration of said slurry and subsequent bridging of the granular material thereby resulting an a stable permeable cement filter mass.

6. The method of providing a permeable cement filter in formations adjacent oil and gas wells which comprises preparing a slurry consisting essentially of between about 140 and about 200 parts by weight of an inert granular solid material in the size range between about 10 and about 40 mesh, between about 20 and about 65 parts by weight Portland type cement having an average particle size less than about 3 microns, between about 2 and about 4 parts by weight water absorbing fibrous material, between about 0.01 and about 1.0 part by weight water soluble gel and between about 100 and about 200 parts by weight water, said slurry having a weight ratio of sand to cement between about 4 and about 7, a weight ratio of water to gel betwen about 100 and about 2500 and a weight ratio of total solids to water between about 1 and about 2, pumping said slurry down a wellbore under sufficient pressure to force the slurry through perforations in the well casing and into the formation adjacent said wellbore, said pressure being sufficient to cause dehydration of said slurry and subsequent bridging of the granular material to thereby form a stable permeable cement filter mass, the permeability of which decreases with increasing distance from the wellbore.

7. The method of providing a permeable cement filter in formations adjacent oil and gas wells which comprises preparing a slurry consisting essentially of between about 140 and about 200 parts by weight of an inert granular solid material in the size range between about 10 and about 40 mesh, between about 20 and about 65 parts of weight Portland type cement, having an average particle size less than 3 microns, between about 2 and about 4 parts by weight of water absorbing, insoluble fibrous material, between about 0.01 and about 1.0 part by weight water soluble gel and between about 100 and about 200 parts by weight water, said slurry having a weight ratio of sand to cement between about 4 and about 7, a weight ratio of water to gel between about 100 and about 2500 and a weight ratio of total solids to water between about 1 and about 2, pumping said slurry down a wellbore under sufficient pressure to force the slurry into the formation adjacent said wellbore, said pressure being sufficient to cause a portion of the cement to move through the slurry to the interface between the cement slurry and formation material, thereby resulting in a relatively low permeability sheath of cement surrounding the resulting cement filter.

8. The method of providing a permeable cement filter in unconsolidated sand formations adjacent oil and gas wells which comprises preparing a slurry consisting essentially of between about 140 and about 200 parts by weight of an inert granular solid material in the size range between about 10 and about 40 mesh, between about 20 and about 65 mesh parts of weight Portland type cement having an average particle size less than 3 microns, between about 2 and about 4 parts by weight asbestos, between about 0.01 and about 1.0 part by weight water soluble gel and between about 100 and about 200 parts by weight water, said slurry having a weight ratio of sand to cement between about 4 and about 7, a weight ratio of water to gel between about 100 and about 2500 and a weight ratio of total solids to water betwen about 1 and about 2, pumping said slurry down a wellbore under sufficient pressure to force the slurry through perforations in the well casing and into the formation adjacent said wellbore, said pressure being sufficient to cause a portion of the cement and water in said slurry to move to the interface between the cement slurry and the unconsolidated formation sand to thereby cooperate with formation sand to form a relatively low permeability sheath of permeable cement surrounding the remainder of the cement filter at said interface.

9. The method of claim 8 in which the cement sheath of relatively low permeability has a permeability of between about 1 and about 10 millidarcies and the remainder of the cement filter has a permeability between about 100 and about 3000 millidarcies.

10. The method of providing a permeable cement filter in oil and gas wells which comprises preparing a slurry consisting essentially of between about 140 and about 200 parts by weight of an inert granular solid material in the size range between about 10 and about 40 mesh, between about 20 and about 65 parts by weight Portland type cement having an average particle size less than 3 microns, between about 2 and about 4 parts by weight asbestos, between about 0.01 and about 1.0 part by weight water soluble gel and between about 100 and about 200 parts by weight water, said slurry having a weight ratio of sand to cement between about 4 and about 7, a weight ratio of water to gel between about 100 and about 2500 and a weight ratio of total solids to water between about 1 and about 2, pumping said slurry down a wellbore initially filled entirely with hydrocarbon oil under sufficient pressure to force the slurry through perforations in the well casing and into the formation adjacent said wellbore, said pressure being sufficient to cause dehydration of said slurry and subsequent bridging of the granular material to form a stable mass of permeable cement filter and to cause cement to move through the slurry to the interface between the slurry and the formation material to form at said interface a relatively low permeability cement sheath surrounding said cement filter.

11. The method of claim 10 in which the hydrocarbon oil initially added to the wellbore is a slug having a volume at least equal to the volume of water present in the casing below the packer.

12. The method of providing a permeable cement filter in unconsolidated formations surrounding oil and gas wells which comprises preparing a slurry consisting essentially of between about 140 and about 200 parts by weight of an inert granular solid material in the size range between about 10 and about 40 mesh, between about 20 and about 65 parts by weight Portland type cement having an average particle size less than 3 microns, between about 2 and about 4 parts by weight of a water absorbing insoluble fibrous material, between about 0.01 and about 1.0 part by weight water soluble gel and between about 100 and 200 parts by weight water, said slurry having a weight ratio of sand to cement between about 4 and about 7, a weight ratio of water to gel between about 100 and about 2500 and a weight ratio of total solids to water between about 1 and about 2, pumping said slurry down a wellbore initially filled with hydrocarbon oil under sufficient pressure to displace the hydrocarbon oil and to force the slurry through perforations in the well casing and radially into the formation adjacent said wellbore, said pressure being sufficient to cause dehydration of said slurry and subsequent bridging of the granular material to form a stable mass of permeable cement filter, and forcing hydrocarbon oil through said cement filter in a quantity equal to at least half the original volume of slurry placed in the formation, the permeability of said cement filter decreasing with increasing distance from the wellbore.

13. The method of claim 12 in which the hydrocarbon oil initially added to the wellbore is a slug having a volume at least equal to the volume of water present in the casing below the packer.

14. A method of providing a permeable cement filter in formations of unconsolidated sands surrounding oil and gas wells which comprises preparing a cement slurry consisting essentially of between about 140 and about 200 parts per weight sand of an average particle size between about 20 and about 30 mesh, between about 20 and about 65 parts by weight Portland type cement having an average particle size less than 3 microns, between 2 and about 4 parts by weight asbestos, between about 0.25 and about 0.40 part by weight polyacrylamide water soluble gel and between about 100 and about 150 parts by weight water, the weight ratio of sand to cement in said slurry being between about 4 and about 7, the water to gel weight ratio being between about 250 and 550 and the weight ratio of solids to water being between about 1 and about 2, pumping said slurry down a wellbore filled entirely with hydrocarbon oil under sufficient pressure to displace the hydrocarbon oil and to force the slurry through perforations in the well casing and into an unconsolidated sand formation adjacent said wellbore, said pressure being sufficient to cause dehydration of said slurry and subsequent bridging of the sand in said slurry to form a stable permeable cement filter, and to cause a portion of the cement in the cement slurry to move to the interface between the cement slurry and the formation sand to thereby form at said interface a relatively low permeable sheath of permeable cement, said sheath having a permeability between about 1 and about 10 millidarcies with the remainder of said cement filter having a permeability between about 100 and about 3000 millidarcies, and the permeability of said cement filter decreasing with increasing distance from the wellbore.

15. The method of claim 14 in which the hydrocarbon oil initially added to the wellbore is a slug having a volume at least equal to the volume of water present in the casing below the packer.

References Cited in the file of this patent

UNITED STATES PATENTS

| | | |
|---|---|---|
| 2,187,895 | Sanders | Jan. 23, 1940 |
| 2,786,531 | Mangold | Mar. 26, 1957 |
| 2,890,752 | Crone | June 16, 1959 |
| 3,044,547 | Jarboe | July 17, 1962 |

UNITED STATES PATENT OFFICE
CERTIFICATE OF CORRECTION

Patent No. 3,119,448                                    January 28, 1964

Vaughan W. Rhoades

It is hereby certified that error appears in the above numbered patent requiring correction and that the said Letters Patent should read as corrected below.

Column 6, line 12, for "said" read -- sand --; line 22, after "solids" insert -- particles --; line 28, for "said" read -- sand --; column 12, line 30, for "permeable", first occurrence, read -- permeability --.

Signed and sealed this 30th day of June 1964.

(SEAL)
Attest:

ERNEST W. SWIDER                                      EDWARD J. BRENNER
Attesting Officer                                             Commissioner of Patents